Jan. 10, 1956    A. A. MILLER    2,730,216
CENTRIFUGALLY OPERATED FRICTION CLUTCHES
Filed Oct. 6, 1952
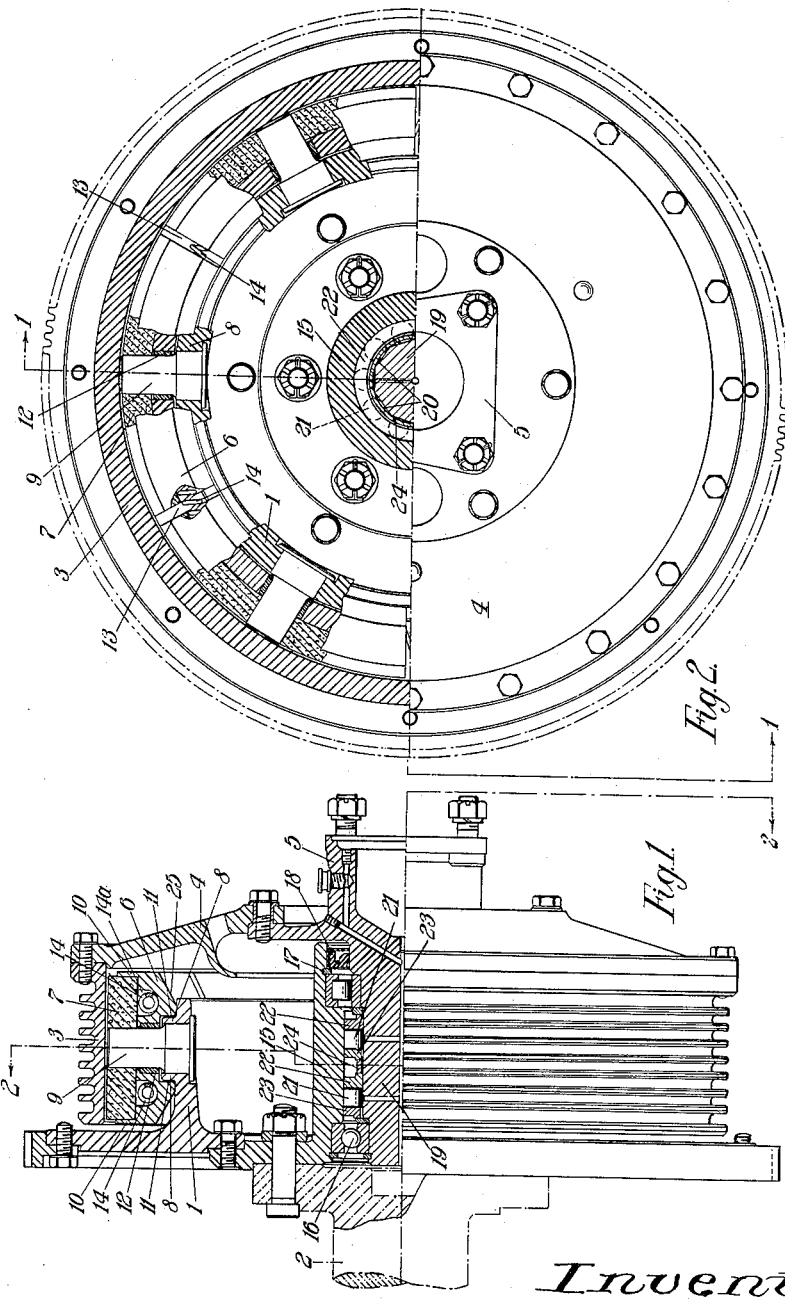
Inventor
A. A. Miller

United States Patent Office 2,730,216
Patented Jan. 10, 1956

2,730,216

CENTRIFUGALLY OPERATED FRICTION CLUTCHES

Albert Arthur Miller, Coventry, England, assignor to Self-Changing Gears Limited, Coventry, England Application October 6, 1952, Serial No. 313,217

Claims priority, application Great Britain October 9, 1951

6 Claims. (Cl. 192—48)

This invention relates to centrifugally operated friction clutches and one of its objects is to provide a clutch of simple construction which is effective in operation and can be readily manufactured at low cost. Another object is to provide a centrifugally operated friction clutch which is particularly suitable for use in motor vehicle transmissions.

The invention comprises centrifugal weights or shoes of arcuate form arranged for frictional engagement with an inner complementary surface of a driven element, means in the form of radially disposed projections for imparting rotation to the centrifugal weights or shoes, and peripherally disposed or endless resilient or spring means for opposing the radial outward motion of the weights or shoes under centrifugal force.

The invention also comprises centrifugal weights or shoes carrying friction members of arcuate form arranged for frictional engagement with an inner complementary surface of a driven element and movable radially independently of said weights or shoes, radially disposed means for guiding and imparting rotation to said weights or shoes and to said friction members, and spring means for opposing the radial outward motion of the weights or shoes under centrifugal force, the arrangement being such that at low speeds of rotation the friction members alone move radially into engagement with the driven element and at higher speeds of rotation the centrifugal weights or shoes also move outwardly against the spring means to increase the engagement pressure of the friction members so that increased torque can be transmitted. The restraining spring means may be formed and arranged in any convenient manner, but in a preferred arrangment the spring means are of endless form and are peripherally disposed as defined in the preceding paragraph. The friction members may be free to move outwardly or they may be restrained by supplementary spring means which preferably exert a smaller restraining force than the spring means controlling the centrifugal weights or shoes.

The invention further comprises an arrangement according to either of the two preceding paragraphs in which the radially disposed driving means are disposed intermediate the ends of the weights or shoes. In a convenient and preferred arrangement said driving means comprise radial pins mounted on a drum or other driving element and the weights or shoes, and preferably the friction members also, are slidable upon the said pins.

According to a further feature of the invention, the centrifugal weights or shoes are guided and additionally restrained against axial motion by sliding engagement with the driving element, preferably by laterally engaging surfaces or flanges which extend substantially throughout the length of the shoes. In a convenient arrangement the inner sides of the arcuate shoes have a channel section which is engaged with a peripheral rib on the driving element or drum. The arcuate shoes are shaped to receive friction elements also of arcuate form and faced with or composed of friction material such as a suitable fabric or composition. The friction members are movable radially independently of the shoes and are preferably engaged and driven by the radial pins which also engage and drive the shoes.

The restraining spring means preferably comprise endless coil springs of garter form encircling all the centrifugal weights or shoes, of which any convenient number may be provided. In a preferred arrangement, two such springs are arranged one on either side of the series of weights or shoes. If desired, a similar arrangement may be employed as supplementary springs for the friction members.

It is preferred to form and arrange the arcuate weights or shoes and the friction members to afford a frictional engaging surface which extends over nearly 360° and for this purpose the shoes are arranged closely end to end with only a small space between them.

To prevent oscillation or vibration of the weights if subjected to irregular angular velocity, it is desirable that their ballistic centres (also known as centres of percussion or centres of oscillation) in respect to the clutch axis should lie within the limits of their engagement with the radial driving means at all times during their operation, and for this purpose it may be necessary to form the weights with a reduced section at their inner sides, or otherwise to modify their shape.

According to a further and optional feature of the invention, a uni-directional or free-wheel clutch is provided between the driving and driven clutch elements, arranged to prevent over-running of the driven element.

In the accompanying drawing,

Figure 1 is a side elevation, partly in section of a centrifugally operated clutch constructed in accordance with the invention, the section being taken on the line 1—1 of Figure 2;

Figure 2 is an end elevation, partly in section, of the clutch, the section being taken on the line 2—2 of Figure 1.

In carrying the invention into effect according to one convenient mode, as applied by way of example to a centrifugally operated clutch for use on motor vehicles as illustrated in the drawing, a hollow drum 1 constituting the driving element is secured to a driving shaft 2 and is arranged within an externally grooved hollow drum 3 constituting the driven element which is secured by a disc 4 to a driven shaft 5, there being an annular space between the two drums for accommodating a series of arcuate shoes 6 constituting centrifugal weights and carrying arcuate friction members 7 adapted to move outwardly under a centrifugal force for frictional engagement with the inner surface of the outer drum 3. The inner drum 1 is formed with a circumferential rib 8 and extending outwardly from the rib are a series of pins 9 of circular section which constitute driving means for the arcuate shoes and for the friction members. The pins may be of other section if desired and the number of pins and shoes may be varied. Six pins and a corresponding number of shoes are provided in the example illustrated and the shoes are engaged by the pins at the centre of their length. The arcuate members 7 carried by the shoes are formed from friction material, such as a suitable fabric or composition, for engagement with the inner surface of the drum 3. The outer surface of each shoe is formed with peripherally extending walls 10 forming a channel section to receive the friction member. The inner side of each shoe is formed with an inwardly facing channel having sides 11 which have a sliding fit on the circumferential rib 8 of the drum 1. A radial hole at the centre of the length of each shoe receives a rubbing sleeve or bush 12 of plastic or other material which is a sliding fit on its corresponding pin 9 and serves to guide the shoe in its radial outward motion. The friction member 7 is similarly apertured to receive the pin 9 and is arranged so that it can move radially outwardly thereon independently of the shoe. The length of the shoes 6 is such that when fitting on the pins they occupy substantially the whole of the circumference of the drum, there being only a small space 13 between the ends of adjacent shoes and of the friction members. Radial motion of the shoes is restrained by two endless coil springs 14 of garter form which encircle the assemblage of shoes and are disposed on opposite sides thereof.

The garter springs 14 are accommodated in circumferential grooves 14a formed in the shoe surfaces which receive the friction members and these grooves are arranged to lie on either side of the driving pins 9. If it is desired to provide supplementary springs for controlling the friction members 7, these may be of similar form to the springs 14 and may be accommodated in grooves formed in the sides of said members.

The driving drum 1 is secured to a hollow shaft 15 and the driven shaft 5, which is also hollow, is arranged within the shaft 15 and is supported at both ends by bearings 16 and 17. A sealing ring 18 is arranged adjacent the bearing 17. A uni-directional or free-wheel clutch arrangement is interposed between the two shafts. For this purpose the intermediate part 19 of the inner shaft 5 is formed with a series of flat surfaces 20 forming inclined planes. Rollers 21 are disposed between the said planes and the cylindrical inner surface of the outer shaft 15. In the present example two sets of rollers 21 are shown arranged in cage members 22 and 23, constituting a pair of uni-directional clutches of well known kind. The two clutch assemblies are separated by a ring 24. It will be understood that these clutches may be of any desired construction and may comprise a single clutch unit. The effect is that the driven clutch element 3 cannot over-run the driving element 1, but the driving element is permitted to over-run the driven element.

The arrangement is such that when the clutch is at rest, the springs 14 hold the shoes 6 against the driving drum 1 and the friction members 7, or most of them, are out of contact with the surface of the outer drum 3. At low speeds of rotation the friction members 7 will move outwardly under centrifugal force on their radial driving pins 9 to engage the interior surface of the driven drum 3, the shoes 6 remaining in their innermost positions under the force of their restraining springs. In this way the friction members will rub lightly against the outer drum when the latter is held stationary, e. g., when the vehicle is at rest and the engine is rotating at a low or idling speed, thereby providing a preliminary or first stage engagement of the clutch. The purpose of providing this light rubbing action is to produce sufficient torque on the vehicle transmission to take up any looseness or backlash and thus obviate any snatch when the engine is accelerated and the shoes 6 move outwardly against the action of the encircling springs 14. Thus as the speed is increased, the centrifugal force of the shoes overcomes the restraining force of the springs and the shoes move outwardly on their pins to force the friction members against the drum 3 and thereby effect full or second stage engagement of the clutch, the torque which can thus be transmitted increasing progressively with increasing speed.

It is to be noted that the outer sides of the shoes 6 are of reduced section as provided by the bevelled surfaces 25, and thereby the inner parts are lightened as compared with a construction having the same section throughout. The purpose of forming the shoes in this way is to ensure that the ballistic centre of the shoe in respect to the axis about which it revolves (i. e. the clutch axis) will always lie within the limits of the driving pin bearing surface, and thus prevent undesired oscillation or vibration of the shoes which may otherwise occur, if the drive is subjected to irregular motion. It is also to be noted that the inner channel sides of the shoes are in sliding engagement with the circumferential rib of the inner drum at all times, so that axial movement of the shoes is prevented, and circumferential alignment is provided for the shoes.

If desired, the interior surface of the drum 3 which is engaged by the friction members 7 may be circumferentially grooved.

The provision of the uni-directional roller clutch between the driving and driven elements or drums prevents the speed of the driven element from exceeding that of the driving element whilst allowing the driving element to overtake or exceed the speed of the driven element. This allows the engine to be rotated by towing the vehicle with a gear engaged as is the practice when other means of starting the vehicle have failed. A further object of the clutch is to prevent excessive speed of the driven element if the vehicle is allowed to run forwardly down a hill under its own weight while the engine is at rest or running at such a low speed that the clutch surfaces are not fully engaged. In such circumstances the clutch ensures that the engine is rotated at the same proportional speed as the driven element or drum and thereby provides a braking effect on the drum and also on the vehicle under such conditions.

It will be understood that while the invention can be applied with particular advantage to motor vehicle clutches, it is not restricted thereto. Also the invention is not restricted to the example described above, since details of construction may be varied to suit particular conditions. Thus the driving and driven elements need not be of simple drum form but may for example constitute part of other elements in a transmission. Also the shoes may be of various shapes, particularly as regards the form of the interengaging surfaces by which they are guided and driven.

I claim:

1. A centrifugal clutch comprising, in combination, arcuate centrifugal weights disposed in annular formation, spring means for opposing outward movement of the weights under centrifugal force, an arcuate friction member associated with each weight and for movement outwardly independently of the weights into engagement with a drive element, and radially disposed driving and guide means each of which is common to one of the weights and its associated friction member and carries said weight and member for simultaneously imparting rotation thereto, whereby at low speeds of rotation the friction members alone move radially into engagement with the driven element and at a predetermined speed of rotation the weights also move outwardly to increase the engagement pressure of the friction members.

2. A clutch according to claim 1, comprising a rotatable drum, and in which the driving and guide means comprise radial pins mounted upon said drum, the weights and friction members being slidable upon said pins.

3. A clutch according to claim 1, in which the weights have lateral guides for restraining axial movement of the friction members relative to the weights.

4. A clutch according to claim 1, in which the weights are engaged with guide means on the driving element for restraining axial movement of the weights, and the latter are provided with lateral guides for restraining axial movement of the friction members relative to the weights.

5. A clutch according to claim 1, in which the weights have a channel section on their interior side engageable over a rib on the driving element, and said weights also have a channel section on their exterior side within which the friction members are slidable, whereby both weights and friction members are restrained against axial movement.

6. A clutch according to claim 1, comprising also a uni-directional clutch operatively arranged between the driving and driven clutch elements whereby over-running of the driven element is prevented.

References Cited in the file of this patent

UNITED STATES PATENTS

| | | |
|---|---|---|
| 1,851,146 | Banker | Mar. 29, 1932 |
| 1,910,141 | Wemp | May 23, 1933 |
| 1,988,922 | Stephenson | Jan. 22, 1935 |
| 2,000,713 | Norris | May 7, 1935 |
| 2,074,510 | Junkers | Mar. 23, 1937 |
| 2,534,134 | Kirkpatrick | Dec. 12, 1950 |
| 2,597,854 | Cross et al. | May 27, 1952 |

FOREIGN PATENTS

| | | |
|---|---|---|
| 303,149 | Great Britain | Feb. 21, 1930 |
| 470,912 | Great Britain | Aug. 24, 1937 |